United States Patent
Contreras Sosa et al.

(10) Patent No.: US 10,899,242 B2
(45) Date of Patent: Jan. 26, 2021

(54) CHARGING ASSEMBLY AND METHOD UTILIZING A CHARGE PORT MOUNTED TO A VEHICLE WHEEL

(71) Applicant: Ford Global Technologies, LLC, Dearborn, MI (US)

(72) Inventors: Mario Contreras Sosa, Naucalpan (MX); Enrique Emanuel Farias, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 476 days.

(21) Appl. No.: 15/861,071

(22) Filed: Jan. 3, 2018

(65) Prior Publication Data

US 2019/0202303 A1    Jul. 4, 2019

(51) Int. Cl.
| | |
|---|---|
| *B60L 53/16* | (2019.01) |
| *B60L 53/18* | (2019.01) |
| *B60L 53/30* | (2019.01) |
| *H01R 13/73* | (2006.01) |
| *H02J 7/00* | (2006.01) |

(52) U.S. Cl.
CPC ............. *B60L 53/16* (2019.02); *B60L 53/18* (2019.02); *B60L 53/30* (2019.02); *H01R 13/73* (2013.01); *H02J 7/0042* (2013.01)

(58) Field of Classification Search
CPC ........ H02J 7/0042; B60L 53/16; B60L 53/18; B60L 53/213; H01R 13/73
USPC ...................................................... 320/109
See application file for complete search history.

(56) References Cited

U.S. PATENT DOCUMENTS

| | | | | |
|---|---|---|---|---|
| 2014/0015470 | A1* | 1/2014 | Lim | H02J 7/025 320/101 |
| 2016/0075177 | A1* | 3/2016 | Biderman | B60L 7/12 301/6.5 |
| 2017/0136896 | A1* | 5/2017 | Ricci | B60L 53/12 |
| 2019/0329809 | A1* | 10/2019 | Mackay | A63B 55/60 |

FOREIGN PATENT DOCUMENTS

| | | | |
|---|---|---|---|
| CN | 202145521 | | 2/2012 |
| CN | 103576696 | | 2/2014 |
| CN | 106043585 | | 10/2016 |
| CN | 205952233 | * | 2/2017 |
| CN | 206217658 | | 6/2017 |

OTHER PUBLICATIONS

Machine English Translation for CN205952233 performed on Nov. 7, 2020, 10 pages.*
Sorokanich, Bob, Tesla's Solid Metal Snake Charger Is Now Terrifyingly Real, Aug. 6, 2016, retrieved on Aug. 18, 2016 from http://www.roadandtrack.com/new-cars/car-technology/news/a26293/tesla-solid-metal-snake-charger/.
Rastelli, Joshue Perez, et al., Autonomous docking based on infrared system for electric vehicle charging in urban areas, Dec. 3, 2013, Sensors, MDPI, 2013, HAL archives.
Copenhagen Wheel User Manual, superpedestrian.

* cited by examiner

*Primary Examiner* — Nathaniel R Pelton
(74) *Attorney, Agent, or Firm* — David Kelley, Esq.; Carlson, Gaskey & Olds, P.C.

(57) ABSTRACT

An exemplary charging assembly includes, among other things, a charge port within a vehicle wheel. The charge port intersects a rotational axis of the vehicle wheel. An exemplary charging method includes, among other things, coupling a charger to a charge port at a position that intersects a rotational axis of a vehicle wheel.

18 Claims, 5 Drawing Sheets

CHARGING ASSEMBLY AND METHOD UTILIZING A CHARGE PORT MOUNTED TO A VEHICLE WHEEL

TECHNICAL FIELD

This disclosure relates generally to a charge port of an electrified vehicle. In particular, the disclosure relates to a charge port mounted to a wheel of the electrified vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Some electrified vehicles, such as PHEVs, can charge the traction battery from an external power source, such as a grid source.

A charger can be coupled to a charge port of the electrified vehicle when charging the traction battery from the external power source. Typically, the charge port is located in a quarter panel or fender of the electrified vehicle.

SUMMARY

A charging assembly according to an exemplary aspect of the present disclosure includes, among other things, a charge port within a vehicle wheel. The charge port intersects a rotational axis of the vehicle wheel.

In a further non-limiting embodiment of the foregoing assembly, the vehicle wheel rotates about the rotational axis.

In a further non-limiting embodiment of any of the foregoing assemblies, a rim and a tire of the vehicle wheel are configured to rotate relative to the charge port.

A further non-limiting embodiment of any of the foregoing assemblies includes a cap assembly configured to transition back and forth between a closed and an open position. The charge port is covered by the cap assembly in the open position. The charge port is uncovered by the cap assembly in the closed position.

A further non-limiting embodiment of any of the foregoing assemblies includes a plurality of doors of the cap assembly. The doors each move radially relative to the rotational axis when moved back and forth between the open position and the closed position.

A further non-limiting embodiment of any of the foregoing assemblies includes a plurality of doors of the cap assembly. The doors are distributed annularly about the rotational axis.

In a further non-limiting embodiment of any of the foregoing assemblies, the vehicle wheel is a non-driven vehicle wheel.

A further non-limiting embodiment of any of the foregoing assemblies includes an actuator that automatically moves a charger to a charging position with the charge port.

In a further non-limiting embodiment of any of the foregoing assemblies, the actuator is configured to align the charging plug in response to a wheel sensor aligning with a charge station sensor.

In a further non-limiting embodiment of any of the foregoing assemblies, the wheel sensor and the charge station sensor are both capacitance-based sensors.

In a further non-limiting embodiment of any of the foregoing assemblies, the vehicle wheel is an electrified vehicle wheel.

A charging method according to another exemplary aspect of the present disclosure includes, among other things, coupling a charger to a charge port at a position that intersects a rotational axis of a vehicle wheel.

A further non-limiting embodiment of the foregoing method includes rotating the vehicle wheel about the rotational axis when driving a vehicle having the vehicle wheel.

In a further non-limiting embodiment of any of the foregoing methods, the charge port is attached directly to the vehicle wheel. The method further includes rotating a rim and a tire of the vehicle wheel relative to the charge port when driving a vehicle having the vehicle wheel.

A further non-limiting embodiment of any of the foregoing methods includes, prior to the coupling, transitioning a cap assembly from a closed position where the charge port is covered by the cap assembly to an open position where the charge port is uncovered by the cap assembly.

In a further non-limiting embodiment of any of the foregoing methods, the cap assembly includes a plurality of doors that each move radially outward relative to the rotational axis when moved from the closed position to the open position.

In a further non-limiting embodiment of any of the foregoing methods, the vehicle wheel is a non-driven vehicle wheel.

A further non-limiting embodiment of any of the foregoing methods includes, during the coupling, moving the charger automatically with an actuator from an uncoupled position with the charge port to a coupled position with the charge port.

A further non-limiting embodiment of any of the foregoing methods includes, during the coupling, aligning the charger and the charge port based at least in part on an alignment of a wheel sensor relative to a charge station sensor.

In a further non-limiting embodiment of any of the foregoing methods, the vehicle wheel is an electrified vehicle wheel.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally a charge port mounted to a vehicle wheel.

Among other things, mounting the charge port to the vehicle wheel can provide an aesthetically enhanced design, and can facilitate automatic engagement with a charger.

Figure 1:
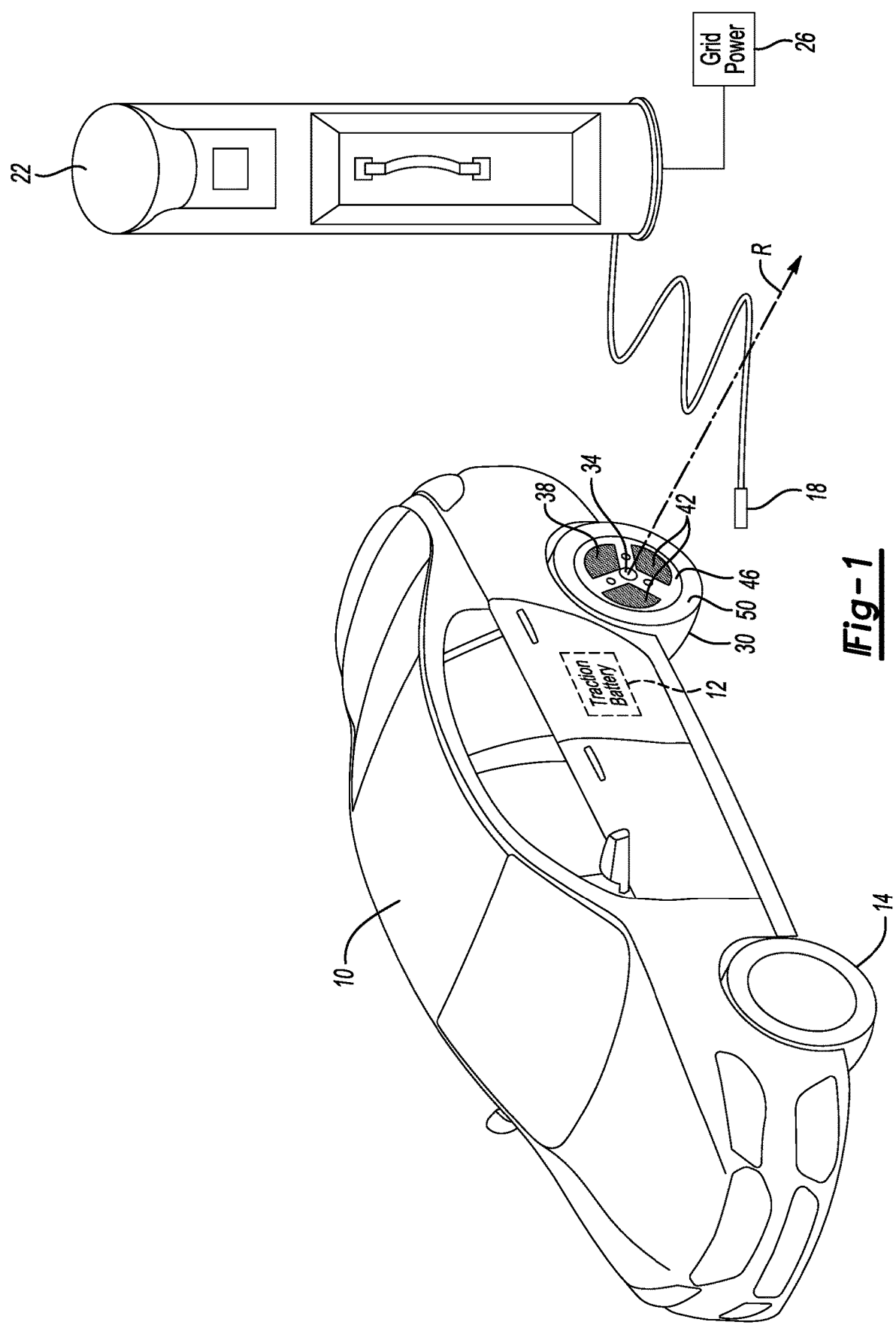
FIG. 1 illustrates an electrified vehicle near a charge station.
Figure 2:
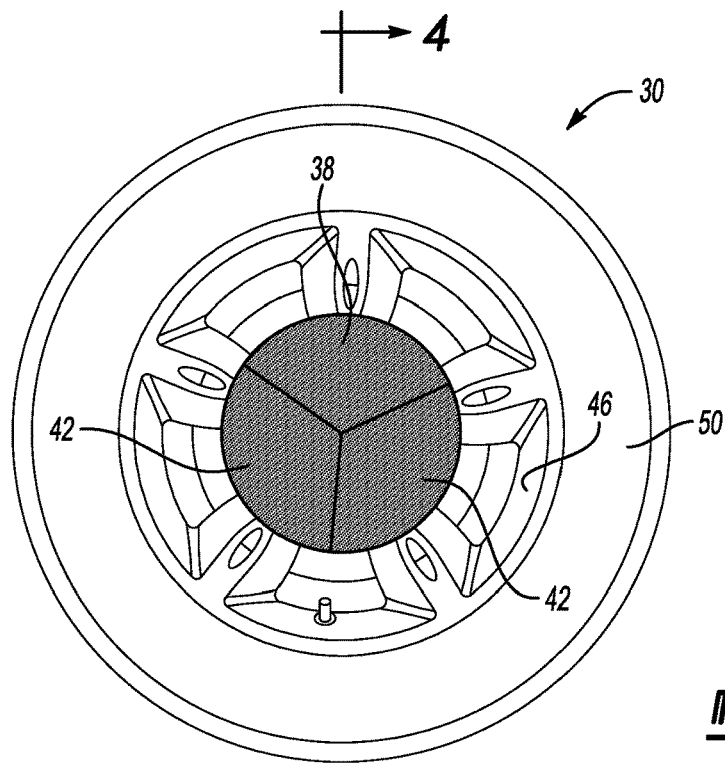
FIG. 2 illustrates a side view of a vehicle wheel from the electrified vehicle of FIG. 1.
Figure 3:
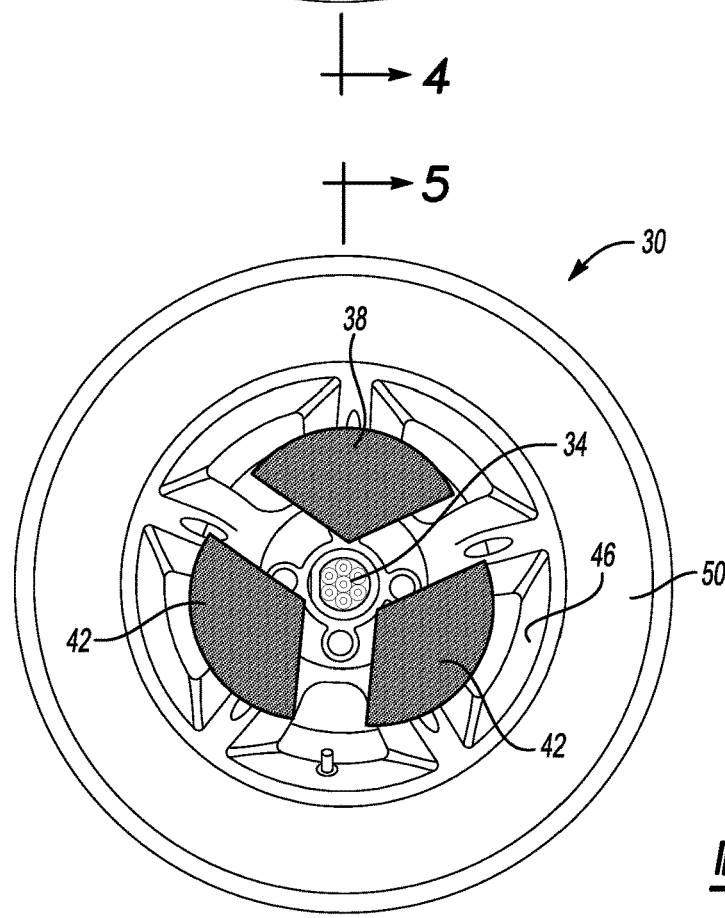
FIG. 3 illustrates the vehicle wheel of FIG. 2 with a plurality of doors of a cap assembly transitioned to an open position to uncover a charge port within the vehicle wheel.
Figure 4:
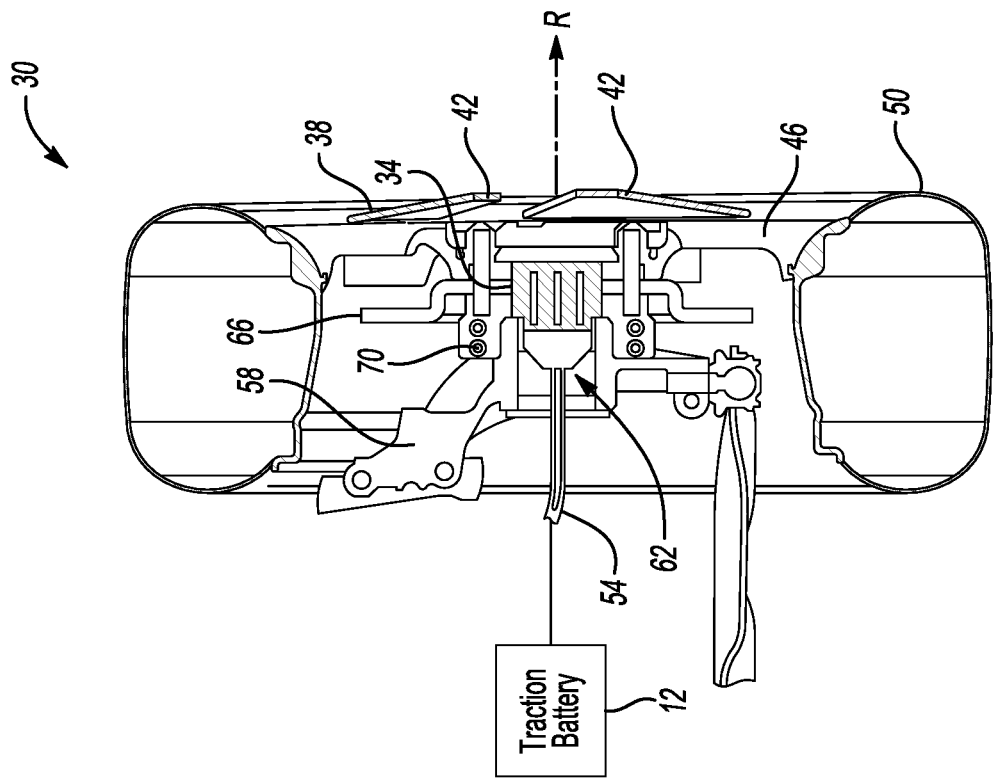
FIG. 4 illustrates a section view taken at line 4-4 in FIG. 2.
Figure 5:
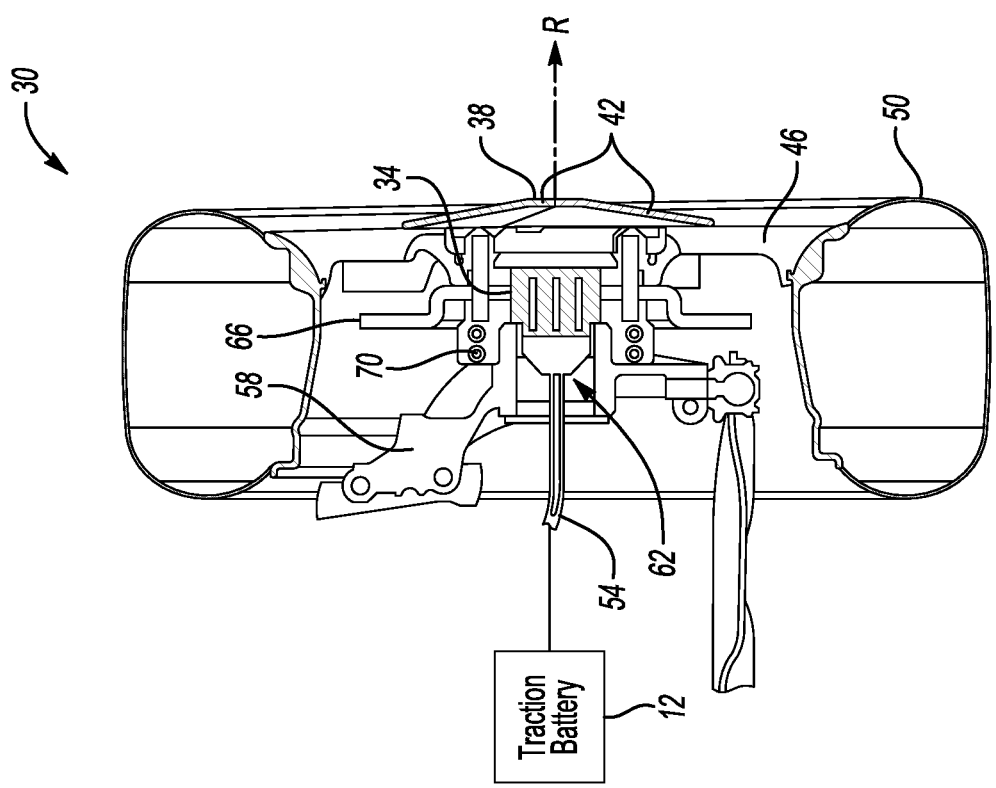
FIG. 5 illustrates a section view taken at line 5-5 in FIG. 3.
Figure 6:
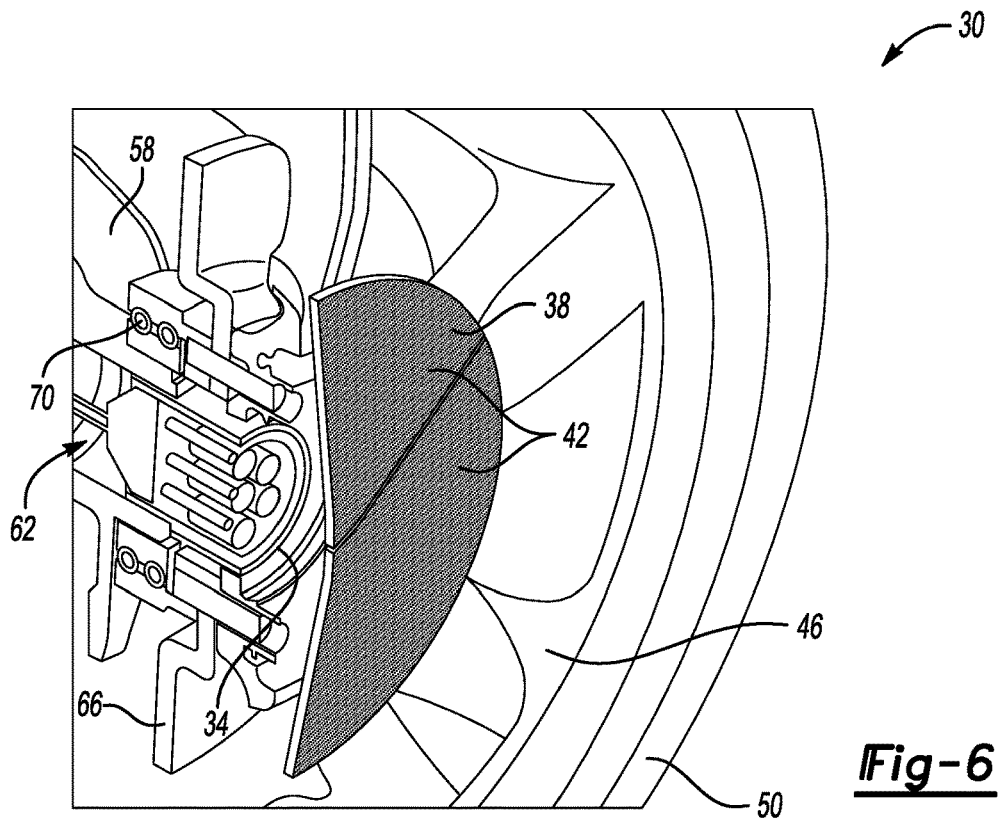
FIG. 6 illustrates a perspective view of the section shown in FIG. 4.
Figure 7:
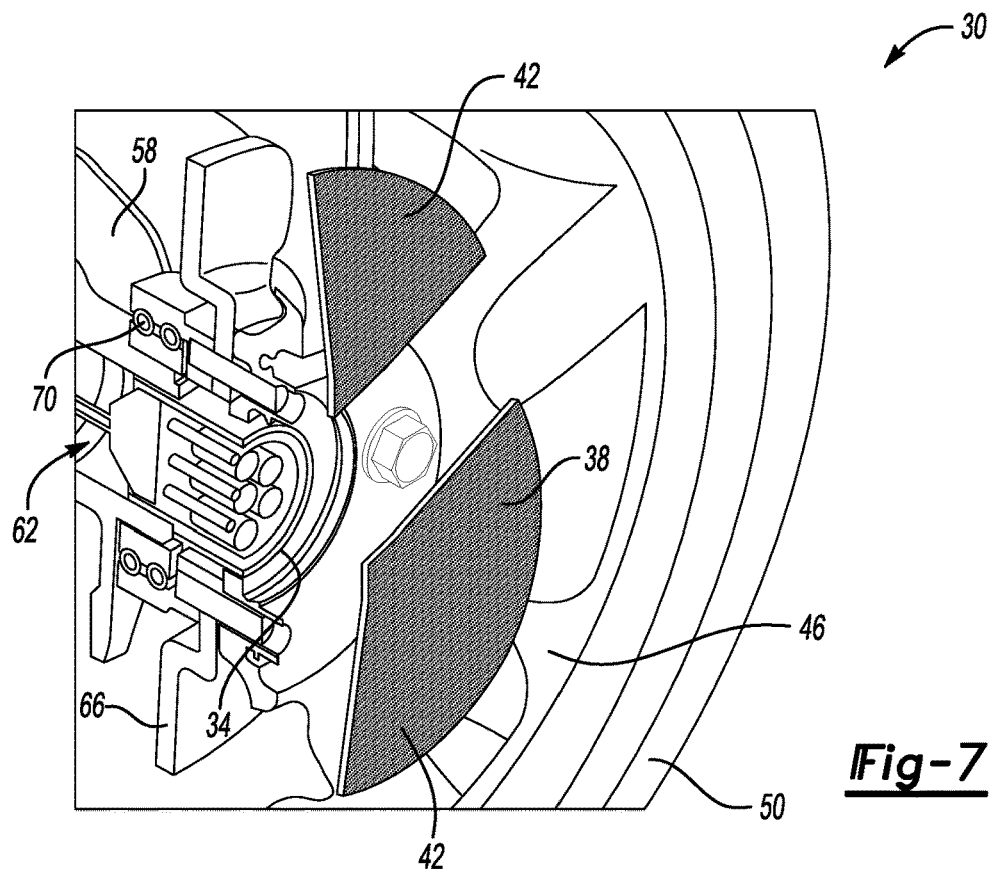
FIG. 7 illustrates a perspective view of the section shown in FIG. 5.

Referring to FIG. 1, an exemplary vehicle 10 is a plug-in hybrid electric vehicle (PHEV) that includes a traction battery 12. A power-split powertrain of the vehicle 10 employs a first drive system and a second drive system. The first and second drive systems generate torque to drive one or more sets of vehicle drive wheels 14. The first drive system can include a combination of an internal combustion engine and a generator. The second drive system can include at least a motor, the generator, and the traction battery 12.

From time to time, charging the traction battery 12 is required or desirable. When the vehicle 10 is moving, power from regenerative braking can be used to charge the traction battery 12. When the vehicle 10 is stationary, an external power source, such as a charger 18 from a charge station 22, can be coupled to the vehicle 10. The charger 18, when coupled, can communicate power from a grid power source 26, for example, to the vehicle 10 to charge the traction battery 12.

Although the example vehicle 10 is a PHEV, the teachings of this disclosure could be utilized in connection with other electrified vehicles that include a chargeable traction battery. The vehicle 10 could be a battery electric vehicle (BEV) incorporating a traction battery, for example.

The vehicle 10 includes a pair of non-driven wheels 30, which are rear wheels in this example. At least one of the wheels 30 includes a charge port 34 and a cap assembly 38 having a plurality of doors 42.

The wheel 30 with the charge port 34 has a rotational axis R. When the vehicle 10 is driven, a rim 46 and a tire 50 of the wheel 30 rotate about the rotational axis R. The rim 46 and the tire 50 rotate relative to the charge port 34 in this example. The charge port 34 intersects the rotational axis R of the wheel 30.

This positioning of the charge port 34 can, among other things, provide aesthetic enhancements to the vehicle 10. Positioning the charge port 34 within the wheel 30, for example, avoids the used of visible cutlines in the body panels of the vehicle 10 to define a charge port.

Further, positioning the charge port 34 in this area rather than, for example, within a body panel of the vehicle 10, can position the charge port 34 closer to a traction battery 12 of the vehicle 10. The closer positioning can save costs associated with wiring 54 that electrically couples the charge port 34 to the traction battery 12.

Referring now to FIGS. 2-6 with continuing reference to FIG. 1, the doors 42 can transition back and forth along radially extending axes between open and closed positions. Aesthetics can be further improved by the cap assembly 38, which, when in the closed position of FIGS. 2, 4, and 6, hides the charge port 34 from view. The cap assembly 38 can additionally protect the charge port 34 against dust, dirt, humidity, corrosion.

As shown in FIGS. 1, 3, 5, and 7, the doors 42 uncover the charge port 34 when the doors 42 are in the open position. When the doors 42 are in the open position and the charge port 34 is uncovered, the charger 18 can be coupled to the charge port 34.

Mechanical actuators, for example, could be used to transition the doors 42 back and forth between the open and closed positions. A person having skill in this art and the benefit of this disclosure could develop such mechanical actuators, or some other way to transition the doors 42 back and forth between the open and closed positions.

The wheel 30 couples to other portions of the vehicle 10 via a suspension knuckle 58. The charge port 34, in this example, is received within an opening 62 of the suspension knuckle 58. During operation, a hub 66 and bearing arrangement 70 permit the rim 46 and the tire 50 to rotate relative to the charge port 34 and the suspension knuckle 58. Again, the charge port 34 remains relatively stationary as the wheel 30 is rotated about the rotational axis R during operation of the vehicle 10.

Figure 8:
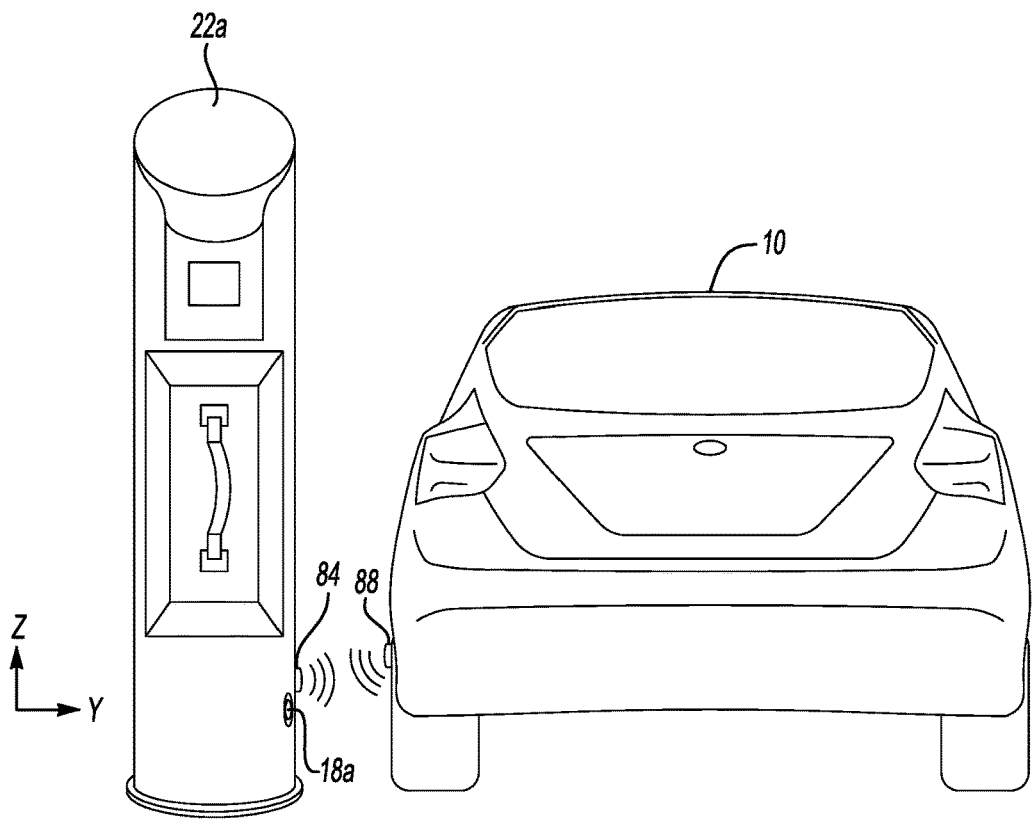
FIG. 8 illustrates a rear view of the vehicle of FIG. 1 adjacent to an automated charging station and having a charger in an uncoupled position.
Figure 9:
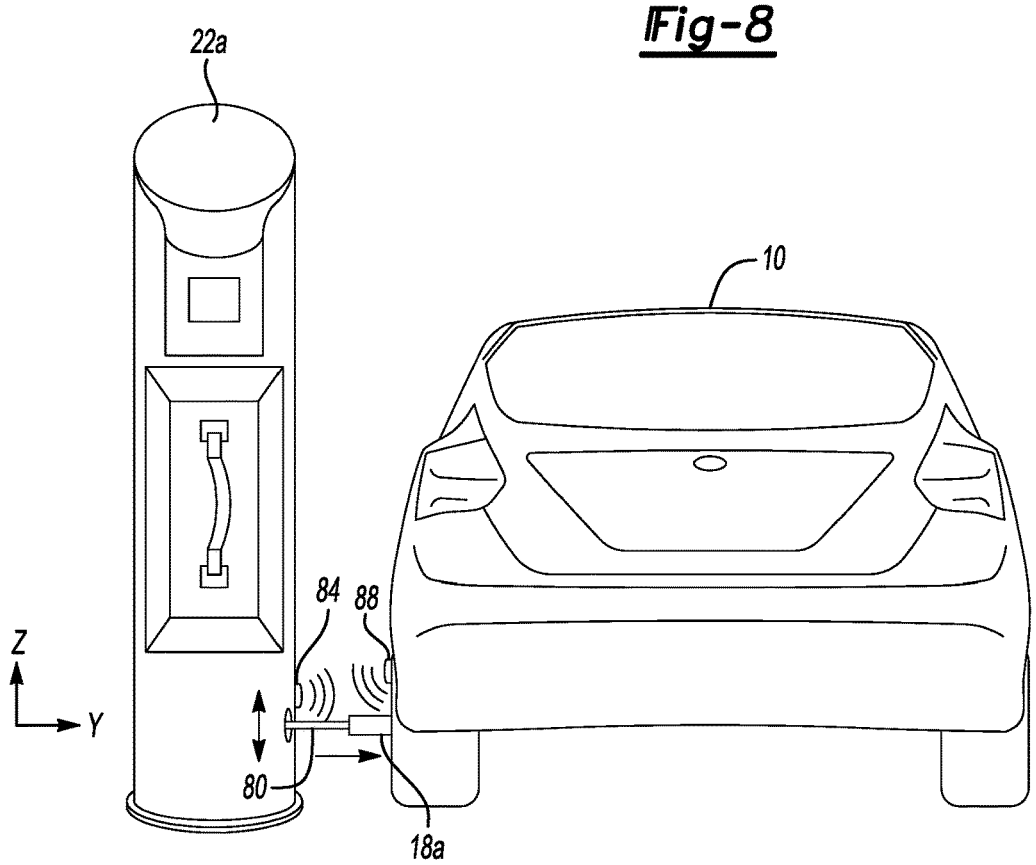
FIG. 9 illustrates the rear view of the vehicle of FIG. 8 adjacent to the automated charging station and having the charger in a coupled position.

The positioning of the charge port 34 within the vehicle wheel 30 of the vehicle 10 can, in some examples, facilitate an automated charge procedure. Referring now to FIGS. 8 and 9, an automated charge procedure can involve an automated charger 18a that is automatically moved by an actuator 80 from an uncoupled position with the charge port 34 to a coupled position with the charge port 34.

The automated charger 18a can include a charge station sensor 84 that transmits and receives locating signals from a wheel sensor 88. The charge station sensor 84 and the wheel sensor 88 can be capacitance-based sensing mechanisms. In some examples, a sensor is mounted to the actuator 80 instead of, or in addition to the charge station sensor 84.

During the automated charge procedure, an operator of the vehicle 10 can initially position the vehicle 10 alongside the charge station 22a having the automated charger 18a. The driver can then then adjust the position of the vehicle 10 until the sensors 84 and 88 indicate that the vehicle 10 and the charge station 22 are aligned. This aligns the automated charger 18a and the charge port 34 along the X-axis, which, in FIGS. 8 and 9 extends out of the page perpendicular to the Y-axis and the Z-axis.

The actuator 80 can then move the automated charger 18a to a coupled position with the charge port 34 (FIG. 1) by further adjusting the position of the automated charger 18a along the Z-axis and the Y-axis. The distance between the charge station 22a and the charge port 34 can be relatively short, which can reduce wiring when compared to chargers that manual couple to the charge port 34.

The automated charge procedure can be helped by locating the charge port 34 within the wheel 30. That is, the charge port 34 within the wheel 30 may be easier to locate than a charge port within another area of the vehicle 10. Among other things, the charge port 34 within the wheel 30 faces laterally outward directly away from the vehicle 10. Thus, the locating can substantially only require locating the automated charger 18a with the actuator 80 along the X-axis and the Z-axis, without tipping or canting the automated charger 18a.

Areas of other vehicles that typically include a charge port, such as the fender or quarter panel, can be canted such that the charge port does not face directly laterally outward. Locating such the charge port would thus require more complex manipulations of the automated charger 18a.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A charging assembly, comprising:
a charge port within a vehicle wheel, the port intersecting a central rotational axis of the vehicle wheel, wherein the vehicle wheel is a non-driven vehicle wheel.

2. The charging assembly of claim 1, wherein the vehicle wheel rotates about the central rotational axis.

3. The charging assembly of claim 1, wherein a rim and a tire of the vehicle wheel are configured to rotate relative to the charge port.

4. The charging assembly of claim 1, further comprising a cap assembly configured to transition back and forth between a closed and an open position, the charge port covered by the cap assembly in the open position, the charge port uncovered by the cap assembly in the closed position.

5. The charging assembly of claim 4, further comprising a plurality of doors of the cap assembly, the doors each moving radially relative to the central rotational axis when moved back and forth between the open position and the closed position.

6. The charging assembly of claim 4, further comprising a plurality of doors of the cap assembly, the doors distributed annularly about the central rotational axis.

7. The charging assembly of claim 1, further comprising an actuator that automatically moves a charger to a charging position with the charge port.

8. The charging assembly of claim 7, wherein the actuator is configured to align the charging plug in response to a wheel sensor aligning with a charge station sensor.

9. The charging assembly of claim 8, wherein the wheel sensor and the charge station sensor are both capacitance-based sensors.

10. The charging assembly of claim 1, wherein the vehicle wheel is an electrified vehicle wheel.

11. A charging method, comprising:
coupling a charger to a charge port at a position that intersects a central rotational axis of a vehicle wheel wherein the vehicle wheel is a non-driven vehicle wheel.

12. The charging method of claim 11, further comprising rotating the vehicle wheel about the central rotational axis when driving a vehicle having the vehicle wheel.

13. The charging method of claim 11, wherein the charge port is attached directly to the vehicle wheel, and further comprising rotating a rim and a tire of the vehicle wheel relative to the charge port when driving a vehicle having the vehicle wheel.

14. The charging method of claim 11, further comprising, prior to the coupling, transitioning a cap assembly from a closed position where the charge port is covered by the cap assembly to an open position where the charge port is uncovered by the cap assembly.

15. The charging method of claim 14, wherein the cap assembly includes a plurality of doors that each move radially outward relative to the central rotational axis when moved from the closed position to the open position.

16. The charging method of claim 11, further comprising, during the coupling, moving the charger automatically with an actuator from an uncoupled position with the charge port to a coupled position with the charge port.

17. The charging method of claim 16, further comprising, during the coupling, aligning the charger and the charge port based at least in part on an alignment of a wheel sensor relative to a charge station sensor.

18. The charging method of claim 11, wherein the vehicle wheel is an electrified vehicle wheel.

* * * * *

UNITED STATES PATENT AND TRADEMARK OFFICE
CERTIFICATE OF CORRECTION

PATENT NO. : 10,899,242 B2
APPLICATION NO. : 15/861071
DATED : January 26, 2021
INVENTOR(S) : Mario Contreras Sosa and Enrique Emanuel Farias Page 1 of 1

It is certified that error appears in the above-identified patent and that said Letters Patent is hereby corrected as shown below:

In the Claims

In Claim 4, Column 5, Line 22; replace "covered" with --uncovered--

In Claim 4, Column 5, Line 23; replace "uncovered" with --covered--

Signed and Sealed this
Eighth Day of March, 2022

Drew Hirshfeld
*Performing the Functions and Duties of the
Under Secretary of Commerce for Intellectual Property and
Director of the United States Patent and Trademark Office*